United States Patent
Zhang et al.

(10) Patent No.: US 8,000,561 B2
(45) Date of Patent: Aug. 16, 2011

(54) APPARATUS, METHOD, AND MEDIUM FOR GENERATING PANORAMIC IMAGE USING A SERIES OF IMAGES CAPTURED IN VARIOUS DIRECTIONS

(75) Inventors: Hui Zhang, Yongin-si (KR); Keun-Ho Kim, Seoul (KR); Do-kyoon Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 914 days.

(21) Appl. No.: 11/902,495

(22) Filed: Sep. 21, 2007

(65) Prior Publication Data

US 2008/0170804 A1 Jul. 17, 2008

(30) Foreign Application Priority Data

Sep. 22, 2006 (KR) ................ 10-2006-0092452

(51) Int. Cl.
*G06K 9/32* (2006.01)
(52) U.S. Cl. ........ 382/294; 382/151; 382/209; 382/219; 382/275; 382/284; 345/629; 358/448; 358/450
(58) Field of Classification Search .................. None
See application file for complete search history.

(56) References Cited

U.S. PATENT DOCUMENTS

| | | | | |
|---|---|---|---|---|
| 6,011,558 A | * | 1/2000 | Hsieh et al. ............. | 345/629 |
| 6,075,905 A | * | 6/2000 | Herman et al. .......... | 382/284 |
| 6,459,821 B1 | * | 10/2002 | Cullen ...................... | 382/294 |
| 2004/0252875 A1 | * | 12/2004 | Crandall et al. ......... | 382/133 |
| 2005/0088534 A1 | | 4/2005 | Shen et al. | |

FOREIGN PATENT DOCUMENTS

WO 98/50885 11/1998

OTHER PUBLICATIONS

Barnea et al. "A class of Algorithms for Fast Digital Image Registration", IEEE Transaction on Computers, vol. C-21, No. 2, pp. 179-186, Feb. 1972.
Bartoli, Direct Image Registration With Gain and Bias, Topics in Automatic 3D Modeling and Processing Workshop, Mar. 2006.
Lucas et al., "An Iterative Image Registration Technique with an Application to Stereo Vision", International Conference on Artificial Intelligence, Aug. 24, 1981, pp. 674-679 (whole document).

(Continued)

*Primary Examiner* — Sath V Perungavoor
*Assistant Examiner* — Jason Heidemann
(74) *Attorney, Agent, or Firm* — Staas & Halsey LLP (57) ABSTRACT

Provided are an apparatus, method, and medium for processing an image. In the apparatus, at least one image selected from images to be stitched so as to make colors of overlapped sections of the images as identical with each other as possible and operating again in response to a re-alignment signal, and an image correction unit generating the re-alignment signal after correcting a color of at least a part of the overlapped sections as a result of the shifting of the at least one image in consideration of colors of the overlapped sections Then the shifting of the image is repeated. Therefore, even when the overlapped sections of the images are not identical in color, the overlapped sections of the images can be precisely aligned when the images are stitched for forming a panoramic image, thereby making the panoramic image more accurate.

9 Claims, 9 Drawing Sheets
(2 of 9 Drawing Sheet(s) Filed in Color)

OTHER PUBLICATIONS

European Search Report dated Mar. 27, 2008, issued in corresponding Patent Application.
Chinese Office Action dated Jun. 28, 2010, issued in Chinese Patent Application No. 200710153559.8.
European Office Action dated May 25, 2011 in European Patent Application No. 07116963.5.
"Groupwise Geometric and Photometric Direct Image Registration", In Proceedings of the 17th British Machine Vision Conference, Sep. 2006 by Adrien Bartoli et al.

* cited by examiner

APPARATUS, METHOD, AND MEDIUM FOR GENERATING PANORAMIC IMAGE USING A SERIES OF IMAGES CAPTURED IN VARIOUS DIRECTIONS

CROSS-REFERENCE TO RELATED APPLICATIONS

This application claims the priority benefit of Korean Patent Application No. 10-2006-0092452, filed on Sep. 22, 2006, in the Korean Intellectual Property Office, the disclosure of which is incorporated herein in its entirety by reference.

BACKGROUND

1. Field

Embodiments relate to image processing, and more particularly, to an apparatus, method, and medium for creating a panoramic image by stitching a plurality of images taken in different directions.

2. Description of the Related Art

A panoramic image is a series of images taken in different directions and stitched in a predetermined manner. Such a panoramic image provides a wide field of view (FOV) of a scene compared to an image captured in one direction. Thus, a more accurate extended view of a scene can be provided.

Images having overlapped sections are captured for making a panoramic image. In detail, in a series of images taken for a panoramic image, a trailing side of a previously captured image is ideally identical with a leading side of a currently captured image. The overlapped sections of images are sections of the images taken of the same portion of a scene, and a more realistic panoramic image can be obtained when the images are stitched with the overlapped sections of the images being precisely aligned.

In a conventional apparatus for generating a panoramic image, a series of images are stitched after adjusting the positions of the images to make the colors of overlapped (identical) sections of the images to be as consistent with each other as possible.

Although it is preferable that the colors of overlapped sections of images taken from the same portion of a scene (object) be identical, the colors of the overlapped sections can be different due to various reasons. For example, the colors of overlapped sections of images can be different due to different camera settings such as exposure time and lighting.

When the colors of overlapped sections of images are not identical, it is difficult to precisely align the overlapped sections of the images using a conventional panoramic image generating apparatus. That is, there is a limit to generating an accurate panoramic image using the conventional panoramic image generating apparatus.

SUMMARY

Embodiments provide an image processing apparatus that can produce a realistic panoramic image by stitching a series of images with overlapped sections of the images being precisely aligned even when the colors of the overlapped sections are not identical.

Embodiments provide an image processing method that can be used to produce a realistic panoramic image by stitching a series of images with overlapped sections of the images being precisely aligned even when the colors of the overlapped sections are not identical.

Embodiments provide a computer-readable recording medium having a computer-readable program for executing an image processing method that can be used to produce a realistic panoramic image by stitching a series of images with overlapped sections of the images being precisely aligned even when the colors of the overlapped sections are not identical.

According to an aspect of embodiments, there is provided an apparatus for processing an image, the apparatus including an image aligning unit to shift at least one image selected from images to be stitched so as to make colors of overlapped sections of the images as identical with each other as possible and operating again in response to a re-alignment signal; and an image correction unit to generate the re-alignment signal after correcting a color of at least a part of the overlapped sections as a result of the shifting of the at least one image in consideration of colors of the overlapped sections.

According to another aspect of embodiments, there is provided a method of processing an image, the method including: (a) shifting at least one image selected from images to be stitched so as to make colors of overlapped sections of the images as identical with each other as possible; and (b) correcting a color of at least a part of the overlapped sections as a result of the shifting of the at least one image in consideration of colors of the overlapped sections, and proceeding to (a).

According to another aspect of embodiments, there is provided a computer-readable recording medium having a computer-readable program for executing a method of processing an image, the method including: shifting at least one image selected from images to be stitched so as to make colors of overlapped sections of the images as identical with each other as possible; and correcting a color of at least a part of the overlapped sections as a result of the shifting of the at least one image in consideration of colors of the overlapped sections, and proceeding to the shifting of the image.

According to another aspect of embodiments, there is provided a method for processing an image, including shifting at least one image selected from images to be stitched so as to make colors of overlapped sections of the images as identical with each other as possible; and correcting a color of at least a part of the overlapped sections as a result of the shifting of the at least one image based on colors of the overlapped sections.

According to another aspect of exemplary embodiments, there is provided at least one computer readable medium storing computer readable instructions to implement methods of embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages will become apparent and more readily appreciated from the following description of exemplary embodiments, taken in conjunction with the accompanying drawings of which.

DETAILED DESCRIPTION OF EMBODIMENTS

Reference will now be made in detail to exemplary embodiments, examples of which are illustrated in the accompanying drawings, wherein like reference numerals refer to like elements throughout. Exemplary embodiments are described below by referring to the figures.

Embodiments provide an image processing apparatus, method, and medium that can generate a more realistic panoramic image. Before describing exemplary embodiments in detail with reference to FIGS. 2 through 8, a general description of a panoramic image will now be made with reference to FIGS. 1A through 1F.

Figure 1A:
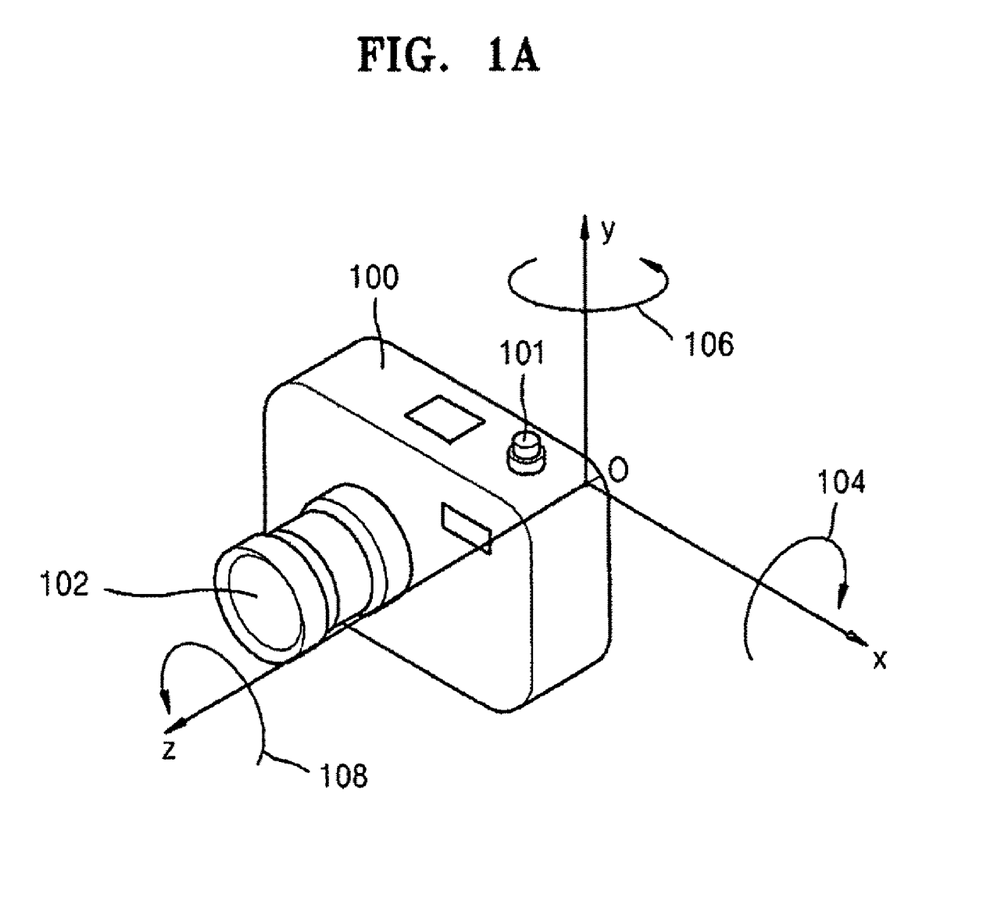
FIG. 1A is a perspective diagram illustrating a photographing device according to an exemplary embodiment.

FIG. 1A is a perspective diagram illustrating a photographing device 100 according to an exemplary embodiment. Examples of the photographing device 100 include a digital camera and other devices having a photographing function such as a portable phone. Accordingly, exemplary embodiments may include any device that can perform a photographing operation. A panoramic image is generated using a plurality of images (photographs) taken with the photographing device 100.

As shown in FIG. 1A, x, y, and z-axes may be orthogonal to one another. However, the x-, y-, and z-axes can be set in different directions. In the configuration shown in FIG. 1A, the z-axis denotes a photographing direction. That is, the z-axis may be a direction where a shutter 102 points. The x, y, and z-axes cross at an origin (O).

Arrow 104 denotes the direction of pitching motion of the photographing device 100 around the x-axis, and arrow 106 denotes the direction of panning motion of the photographing device 100 around the y-axis. Arrow 108 denotes the direction of rolling motion of the photographing device 100 around the z-axis. Hereinafter, the term pitching angle denotes the amount of pitching motion of the photographing device 100 in the direction of arrow 104, the term panning angle denotes the amount of panning motion of the photographing device 100 in the direction of arrow 106 and the term rolling angle denotes the amount of rolling motion of the photographing device 100 in the direction of arrow 108. Further, the positive directions of pitching, panning, and rolling motions of the photographing device 100 are the directions of arrows 104, 106, and 108, respectively.

Figure 1B:
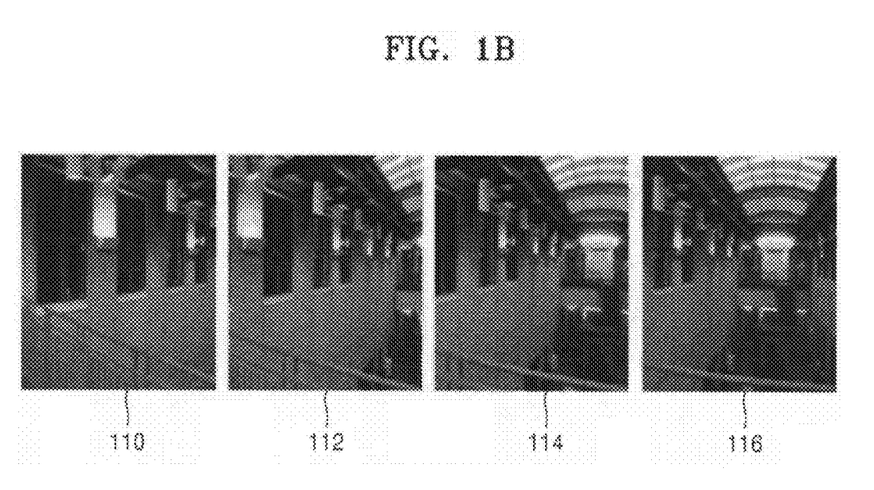
FIGS. 1B, 1C, and 1D are diagrams for explaining a single-row panoramic image according to an exemplary embodiment.
Figure 1C:
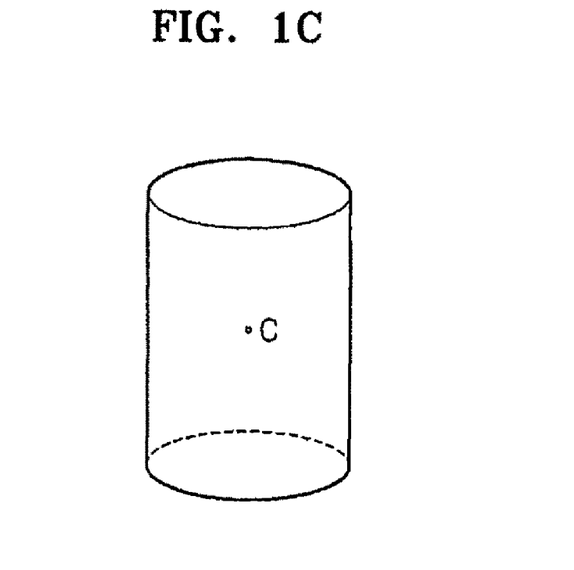
Figure 1D:
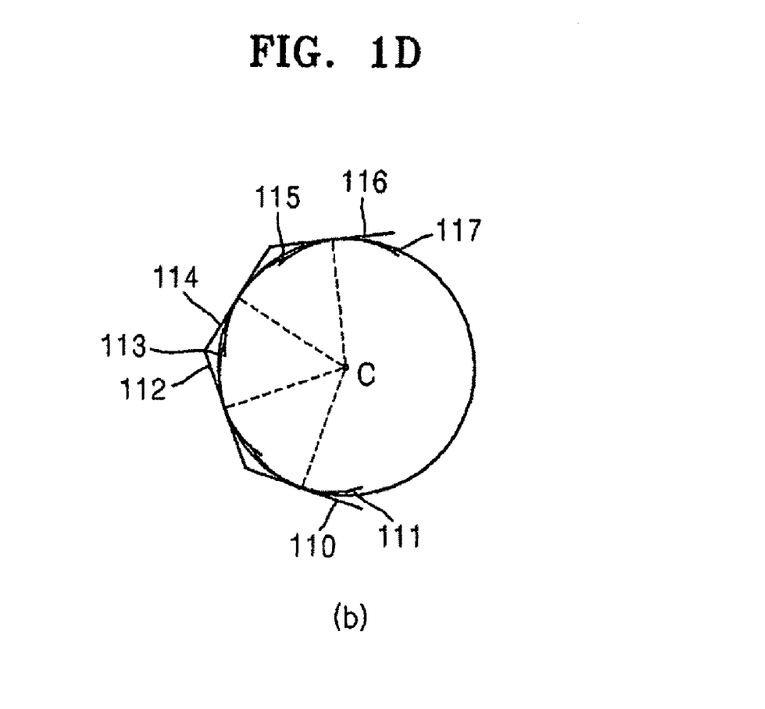
Figure 1E:
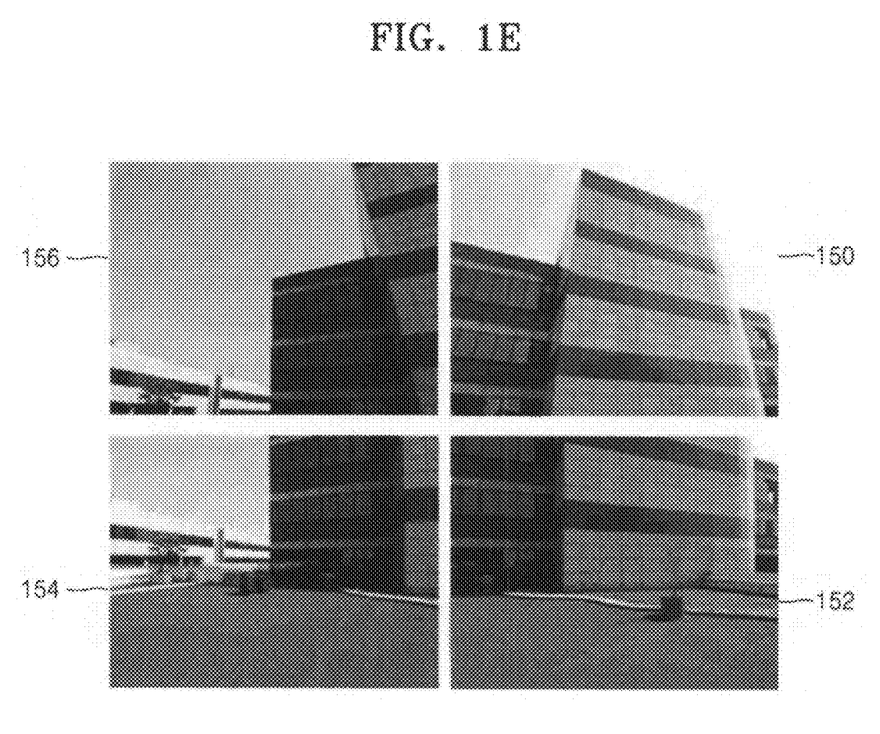
FIGS. 1E and 1F are diagrams for explaining a multi-row panoramic image according to an exemplary embodiment.
Figure 1F:
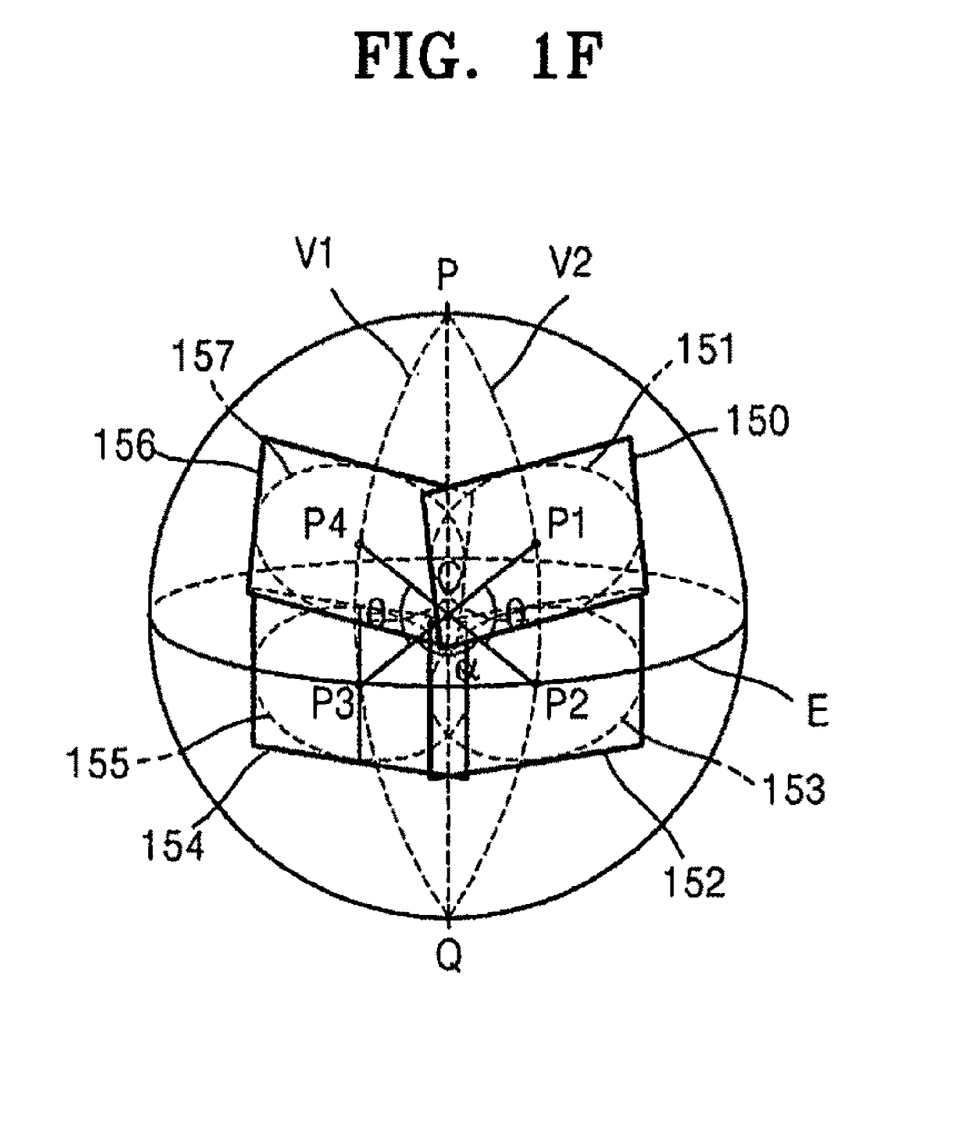

FIGS. 1B, 1C, and 1D are diagrams for explaining a single-row (horizontal) panoramic image according to an exemplary embodiment, and FIGS. 1E and 1F are diagrams for explaining a multi-row (spherical) panoramic image according to an exemplary embodiment.

The term "single-row (horizontal) panoramic image" is used herein to denote a panoramic image made using a series of images 110, 112, 114, and 116 captured from a fixed point (C) at different horizontal angles (i.e., in different horizontal photographing directions) using the photographing device 100. For example, the photographing device 100 itself, a photographer holding the photographing device 100, or a physical part (e.g., an arm) of the photographer may rotate around the fixed point (C) to capture the images 110, 112, 114, and 116.

Referring to FIG. 1B, the images 110, 112, 114, and 116 may be an $m^{th}$ captured image (where m is a natural number), an $(m+1)^{th}$ captured image, an $(m+2)^{th}$ captured image, and an $(m+3)^{th}$ captured image, respectively. Alternatively, the images 110, 112, 114, and 116 can be an $(m+3)^{th}$ captured image, an $(m+2)^{th}$ captured image, an $(m+1)^{th}$ captured image, and an $m^{th}$ captured image, respectively. Herein, the term "captured image" is used to denote a photograph, and the $m^{th}$ captured image denotes an $m^{th}$ image among a series of captured images.

Referring to FIG. 1C, the fixed point (C) is a center point from which a series of images are captured at different angles. For example, when the photographing device 100 is fixed to a fixture of a tripod that is rotated to capture a series of images at different angles using the photographing device 100, the tripod corresponds to the fixed point (C). When a photographer captures a series of images at different angles while moving his arm holding the photographing device 100 along a predetermined path, the photographer (specifically, a shoulder of the photographer functioning as a rotation center of the arm) corresponds to the fixed point (C).

In FIG. 1D, reference numerals 111, 113, 115, and 117 denote an $m^{th}$ mapping image, an $(m+1)^{th}$ mapping image, an $(m+2)^{th}$ mapping image, and an $(m+3)^{th}$ mapping image, respectively. Alternatively, the images 111, 113, 115, and 117 can be an $(m+3)^{th}$ mapping image, an $(m+2)^{th}$ mapping image, an $(m+1)^{th}$ mapping image, and an $m^{th}$ mapping image, respectively. Herein, the term "mapping image" is used to denote an image formed by projecting a captured image onto a predetermined curved surface. That is, the $m^{th}$ mapping image is an image formed by projecting the $m^{th}$ captured image on the predetermined curved surface.

The captured images 110, 112, 114, and 116 are projected onto the predetermined curved surface to form the mapping images 111, 113, 115, and 117. Then, the mapping images 111, 113, 115, and 117 are stitched (connected) together so as to create a single-row panoramic image. Here, the predetermined curved surface is at least a portion of a side surface of a cylinder (hereinafter, referred to as a cylindrical surface).

A circle shown in FIG. 1D is a cross-section of the cylinder. As shown in FIG. 1D, centers of the captured images 110, 112, 114, and 116 are placed on the circumference of the circle, and the mapping images 111, 113, 115, and 117 are entirely formed on the circumference of the circle.

The term "multi-row panoramic image" is used herein to denote a panoramic image made using a series of images 150, 152, 154, and 156 captured from a fixed point (C) at different spherical angles (i.e., in different spherical photographing directions) using the photographing device 100. For example, the photographing device 100 itself, a photographer holding the photographing device 100, or a physical part (e.g., an arm) of the photographer may horizontally and vertically rotate centered on the fixed point (C) to capture the images 150, 152, 154, and 156.

Referring to FIGS. 1E and 1F, reference numerals 150 through 157 may denote an $m^{th}$ captured image, an $m^{th}$ mapping image, an $(m+1)^{th}$ captured image, an $(m+1)^{th}$ mapping image, an $(m+2)^{th}$ captured image, an $(m+2)^{th}$ mapping image, an $(m+3)^{th}$ captured image, and an $(m+3)^{th}$ mapping image, respectively. Alternatively, reference numerals 150 through 157 may denote an $(m+1)^{th}$ captured image, an $(m+1)^{th}$ mapping image, an $(m+2)^{th}$ captured image, an $(m+2)^{th}$ mapping image, an $(m+3)^{th}$ captured image, an $(m+3)^{th}$ mapping image, an $m^{th}$ captured image, and an $m^{th}$ mapping image, respectively. Alternatively, reference numerals 150 through 157 may denote an $(m+2)^{th}$ captured image, an $(m+2)^{th}$ mapping image, an $(m+3)^{th}$ captured image, an $(m+3)^{th}$ mapping image, an $m^{th}$ captured image, an $m^{th}$ mapping image, an $(m+1)^{th}$ captured image, and an $(m+1)^{th}$ mapping image, respectively. Alternatively, reference numerals 150 through 157 may denote an $(m+3)^{th}$ captured image, an $(m+3)^{th}$ mapping image, an $m^{th}$ captured image, an $m^{th}$ mapping image, an $(m+1)^{th}$ captured image, an $(m+1)^{th}$ mapping image, an $(m+2)^{th}$ captured image, and an $(m+2)^{th}$ mapping image, respectively.

Referring to FIG. 1F, a fixed (center) point is denoted by the letter C like in FIGS. 1C and 1D. The uppermost point (an upper pole), the lowermost point (a lower pole), and the equator of a sphere are denoted using P, Q, and E, respectively. Reference characters V1 and V2 denote longitude lines of the sphere. Reference characters P1, P2, P3, and P4 denote centers of the captured images 150, 152, 154, and 156, respectively. Reference character ($\alpha$) denotes a panning angle between the captured images 152 and 154 (or between the captured images 150 and 156), and reference character ($\theta$) denotes a pitch angle between the captured images 152 and 150 (or between the captured images 154 and 156). As shown in FIG. 1F, the centers P2, and P3 can be located in the equator (E), and the centers P1 and P4 can be located in a line parallel to the equator (E).

A multi-row panoramic image is produced by projecting the captured images 150, 152, 154, and 156 onto a predetermined curved surface to form the mapping images 151, 153, 155, and 157 and by stitching the mapping images 151, 153, 155, and 157. Here, the predetermined surface is at least a portion of a surface of the sphere (hereinafter, referred to as a spherical surface). As shown in FIG. 1F, the centers P1, P2, P3, and P4 of the captured images 150, 152, 154, and 156 are placed on the spherical surface, and the mapping images 151, 153, 155, and 157 are entirely formed on the spherical surface.

Figure 2:
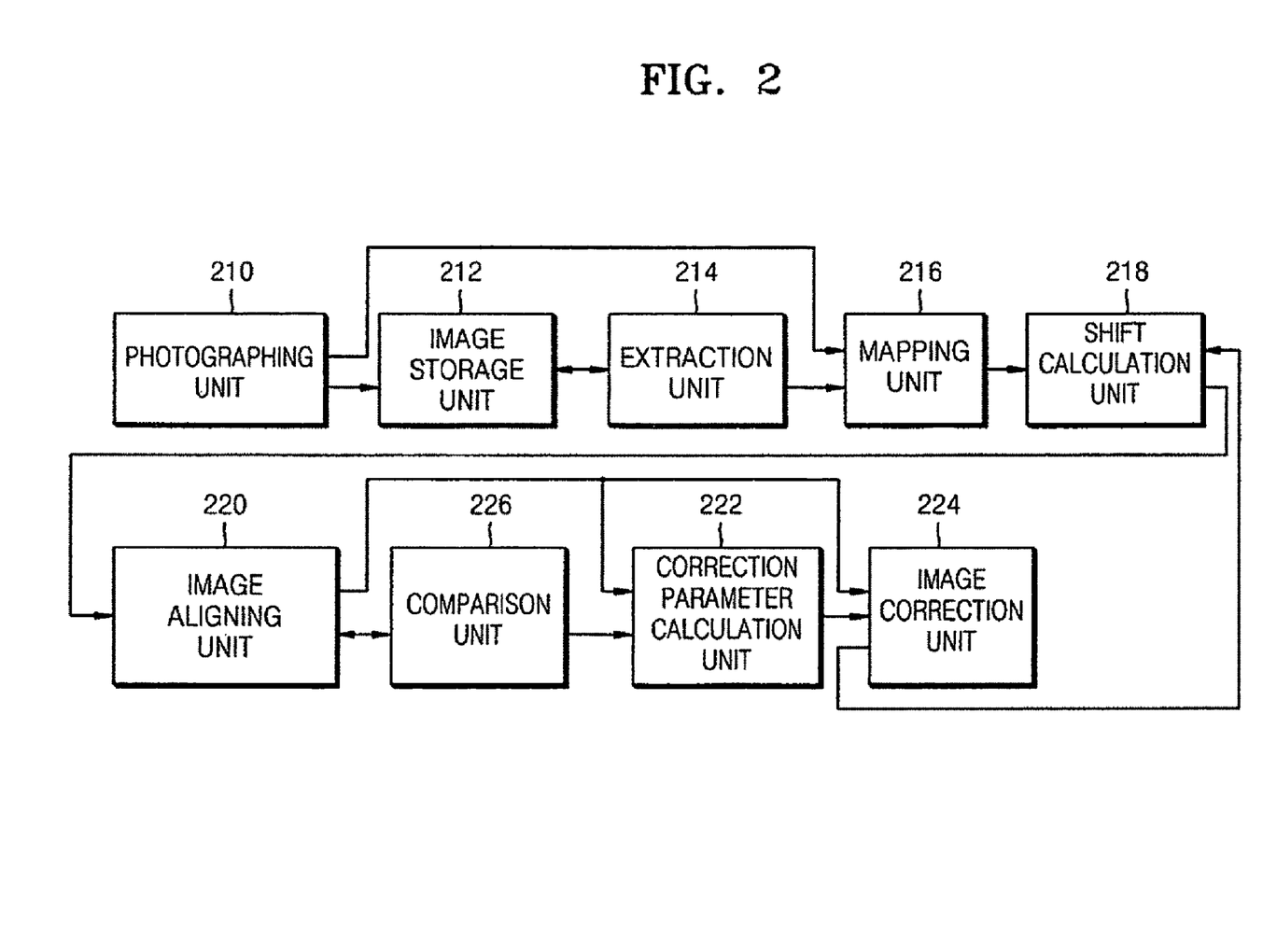
FIG. 2 is a block diagram illustrating an image processing apparatus according to an exemplary embodiment.

FIG. 2 is a block diagram illustrating an image processing apparatus according to an exemplary embodiment. The image processing apparatus may include a photographing unit 210, an image storage unit 212, an extraction unit 214, a mapping unit 216, a shift calculation unit 218, an image aligning unit 220, a correction parameter calculation unit 222, an image correction unit 224, and a comparison unit 226.

The units 210 through 226 may be included in a photographing device 100 (refer to FIG. 1A). The photographing device 100 may further include a display unit (not shown) such as a liquid crystal display (LCD). In the photographing device 100, the display unit displays an image obtained through a lens (not shown) of a scene.

A photographer can find a desired image from images of a scene displayed on the display unit. Then, the photographer can capture the desired image by manipulating a photographing button 101 (refer to FIG. 1A). The photographing button 101 may be a press button or touch button.

After that, the photographing unit 210 captures the image displayed on the display unit at the moment when the photographing button is manipulated, and the image storage unit 212 stores the captured image.

The extraction unit 214 reads the image stored in the image storage unit 212, and the mapping unit 216 creates a mapping image by mapping the read image onto a predetermined curved surface. Further, the mapping unit 216 can directly receive the captured image from the photographing unit 210 and directly create a mapping image by mapping the received image onto a predetermined curved surface. As described above, the predetermined curved surface may be a cylindrical or spherical surface.

The shift calculation unit 218 calculates shift values in preset directions for images to be stitched so as to maximize the color similarity of overlapped sections of the images to be stitched using the calculated shift values.

The pitching, panning, and rolling directions (described in FIG. 1A with reference to arrows 104, 106, and 108, respectively) of the photographic device 100 may be examples of the preset directions. The images to be stitched can be a plurality of mapping images used for producing a panoramic image. For example, the images to be stitched can be an $n^{th}$ mapping image (where n is a natural number) and an $(n+1)^{th}$ mapping image.

Furthermore, the shift values can be calculated for captured images or mapping images. That is, a shift value may be calculated for at least one of an $n^{th}$ captured image and an $(n+1)^{th}$ captured image or for at least one of an $n^{th}$ mapping image and an $(n+1)^{th}$ mapping image. It can be determined depending on the preset direction whether the shift value is calculated for captured images or mapping images.

When images captured in different directions have no overlapping section (refer to FIGS. 1D and 1F), the shift calculation unit 218 can calculate a proper shift value for $n^{th}$ and $(n+1)^{th}$ captured images after projecting one of the images onto a plane including the other. Here, the image is projected regardless of the focal length of the photographing device 100, and thus the shape and area of the image are not changed by the projection.

In an exemplary embodiment, a captured image (or a mapping image) includes a plurality of pixels each having a particular color. That is, each pixel has color information representing a particular color. For example, such color information includes a combination of a red component, a green component, and a blue component. When each of the red, green, and blue components is assigned 8 bits, each component can represent 256 colors. That is, each of the red, green, and blue components has one of 256 color values (0-255). For example, a color value of 0 represents the deepest green color for the green component, and a color value of 255 represents the lightest green color for the green component.

Candidate shift values can be prepared in each preset direction. In this case, the shift calculation unit 218 shifts at least one of $n^{th}$ and $(n+1)^{th}$ captured images (or at least one of $n^{th}$ and $(n+1)^{th}$ mapping images) in each preset direction by a selected candidate shift value. Then, the shift calculation unit 218 calculates a color similarity between overlapped sections of the $n^{th}$ and $(n+1)^{th}$ captured images (or the $n^{th}$ and $(n+1)^{th}$ mapping images). The shift calculation unit 218 repeats these procedures for all the candidate shift values in each preset direction and determines one of the candidate shift values resulting in a maximum color similarity as a proper shift value.

In an exemplary embodiment, the maximum color similarity between overlapped sections of images is determined as follows: each time when at least one of the images moved by the candidate shift value, colors of respective pixels of the overlapped sections of the images are compared to calculate a color similarity between the overlapped sections of the images, that is, the color similarity is calculated for all pixels of the overlapped sections of the image; and the maximum of the color similarities calculated for the respective candidate shift values is selected as the maximum color similarity. Here, the maximum color similarity can be determined based on the number of pixels of the overlapped sections having a color similarity higher than 90% or the mean value of the color similarities of the pixels of the overlapped sections, or the like.

For example, when a right section, having 100 pixels, of an $n^{th}$ mapping image is overlapped with a left section, having 100 pixels, of an $(n+1)^{th}$ mapping image, the shift calculation unit 218 selects a shift value from candidate shift values for each preset direction and moves the $n^{th}$ and $(n+1)^{th}$ mapping images by the selected proper shift value. Then, the shift calculation unit 218 calculates 100 color similarity values between the right-section 100 pixels and the left-section 100 pixels and finds a mean value of the 100 similarity values. In this way, the shift calculation unit 218 calculates mean values for all the candidate shift values and determines a proper shift value corresponding to the maximum mean value.

The shift calculation unit 218 can calculate the same proper shift value for $n^{th}$ and $(n+1)^{th}$ captured images or $n^{th}$ and $(n+1)^{th}$ mapping images. Alternatively, the shift calculation unit 218 can calculate different proper shift values for $n^{th}$ and $(n+1)^{th}$ captured images and for $n^{th}$ and $(n+1)^{th}$ mapping images.

That is, when the photographing unit 210 captures a first image 110 or 150 and a second image 112 or 152 (refer to FIGS. 1B through 1F), the shift calculation unit 218 calculates proper shift values for aligning the first captured image 110 or 150 and the second captured image 112 or 152 (or for aligning a first mapping image 111 or 151 and a second mapping image 113 or 153). Then, when the photographing unit 210 captures a third image 114 or 154, the shift calculation unit 218 calculates proper shift values for aligning the second captured image 112 or 152 and the third captured image 114 or 154 (or for aligning the second mapping image 113 or 153 and a third mapping image 115 or 155). Here, since the proper shift value for the second captured image 112 or 152 (or the second mapping image 113 or 153) is calculated again, the previous proper shift value for the second captured image 112 is replaced with the current proper shift value. In the same way, when the photographing unit 210 captures a fourth image 116 or 156, the shift calculation unit 218 calculates proper shift values for aligning the third captured image 114 or 154 and the fourth captured image 116 or 156 (or for aligning the third mapping image 115 or 155 and a fourth mapping image 117 or 157). Here, since the proper shift value for the third captured image 114 or 154 (or the second mapping image 115 or 155) is calculated again, the previous proper shift value for the third captured image 114 or 154 is replaced with the current proper shift value.

If an $n^{th}$ captured image is not the first captured image 110 or 150, the shift calculation unit 218 can calculate a proper shift value only for an $(n+1)^{th}$ captured image or an $(n+1)^{th}$ mapping image without calculating a proper shift value for the $n^{th}$ captured image or an $n^{th}$ mapping image. That is, once a proper shift value is calculated for a captured image (or a mapping image), the shift calculation unit 218 may not calculate a proper shift value again for the same captured image (or the same mapping image).

In this case, when the photographing unit 210 captures the first image 110 or 150 (which is not the first image that is captured) and a second image 112 or 152, the shift calculation unit 218 calculates proper shift values for aligning the first captured image 110 or 150 and the second captured image 112 or 152 (or for aligning a first mapping image 111 or 151 and a second mapping image 113 or 153). Then, when the photographing unit 210 captures a third image 114 or 154, the shift calculation unit 218 calculates a proper shift values for the third captured image 114 or 154 (or for a third mapping image 115 or 155). Similarly, when the photographing unit 210 captures a fourth image 116 or 156, the shift calculation unit 218 calculates a proper shift value for the fourth captured image 116 or 156 (or for a fourth mapping image 117 or 157).

When the shift calculation unit 218 calculates a proper shift value for a captured image (specifically, when the shift calculation unit 218 calculates a proper shift value for at least one of an $n^{th}$ captured image and an $(n+1)^{th}$ captured image), the image aligning unit 220 moves at least one of the $n^{th}$ and $(n+1)^{th}$ captured images by the calculated proper shift value. Then, the mapping unit 216 generates an $n^{th}$ mapping image and an $(n+1)^{th}$ mapping image using the $n^{th}$ and $(n+1)^{th}$ captured images.

Similarly, when the shift calculation unit 218 calculates a proper shift value for a mapping image, specifically, when the shift calculation unit 218 calculates a proper shift value for at least one of an $n^{th}$ mapping image and an $(n+1)^{th}$ mapping image, the image aligning unit 220 moves at least one of the $n^{th}$ and $(n+1)^{th}$ mapping images by the calculated proper shift value.

After at least one of the $n^{th}$ and $(n+1)^{th}$ captured images or at least one of the $n^{th}$ and $(n+1)^{th}$ mapping images obtained from the $n^{th}$ and $(n+1)^{th}$ captured images is moved by the proper shift value, the correction parameter calculation unit 222 calculates a correction parameter in consideration of colors of overlapped sections of the $n^{th}$ and $(n+1)^{th}$ mapping images.

The image correction unit 224 corrects colors of at least a portion of the overlapped sections of the $n^{th}$ and $(n+1)^{th}$ mapping images using the calculated correction parameter. For example, the portion of the overlapped sections of the $n^{th}$ and $(n+1)^{th}$ mapping images may be the overlapped section of the $n^{th}$ mapping image (hereinafter, referred to as an $n^{th}$ overlapped section), the overlapped section of the $(n+1)^{th}$ mapping image (hereinafter, referred to as an $(n+1)^{th}$ overlapped section), both the overlapped sections of the $n^{th}$ and $(n+1)^{th}$ mapping images, a portion of the overlapped section of the $n^{th}$ mapping image, a portion of the overlapped section of the $(n+1)^{th}$ mapping image, or portions of the overlapped sections of the $n^{th}$ and $(n+1)^{th}$ mapping images.

Hereinafter, it is assumed for clarity that the image correction unit 224 corrects the color of the $n^{th}$ overlapped section but does not correct the color of the $(n+1)^{th}$ overlapped section, and the correction parameter calculation unit 222 calculates a correction parameter using Equation 1 below.

$$\text{ratio\_R} = \frac{Rn+1}{Rn}$$
$$\text{ratio\_G} = \frac{Gn+1}{Gn}$$
$$\text{ratio\_B} = \frac{Bn+1}{Bn}$$

[Equation 1]

where R, G, and B denote red, green, and blue. Ratio_R, ratio_G, and ratio_B denote correction parameters for red, green, and blue colors, respectively.

Further, Rn denotes the sum of red components of all pixels of an $n^{th}$ overlapped section, Rn+1 denotes the sum of red components of all pixels of an $(n+1)^{th}$ overlapped section, Gn denotes the sum of green components of all the pixels of the $n^{th}$ overlapped section, Gn+1 denotes the sum of green components of all the pixels of the $(n+1)^{th}$ overlapped section, Bn denotes the sum of blue components of all the pixels of the $n^{th}$ overlapped section, and Bn+1 denotes the sum of blue components of all the pixels of the $(n+1)^{th}$ overlapped section.

In the case where the image correction unit 224 corrects the color of the $(n+1)^{th}$ overlapped section but does not correct the color of the $n^{th}$ overlapped section, the correction parameter calculation unit 222 can calculate a correction parameter using Equation 2 below.

$$\text{ratio\_R} = \frac{Rn}{Rn+1}$$
$$\text{ratio\_G} = \frac{Gn}{Gn+1}$$
$$\text{ratio\_B} = \frac{Bn}{Bn+1}$$
[Equation 2]

The image correction unit 224 multiplies a color value of each pixel of the $n^{th}$ overlapped section by the correction parameter calculated using Equation 1 and outputs the multiplied result as a corrected color value (hereinafter, referred to as a corrected value) for each pixel of the $n^{th}$ overlapped section. This procedure can be explained by Equation 3 below.

$$R\_corrected\_i = R\_org\_i * \text{ratio}\_R$$
$$G\_corrected\_i = G\_org\_i * \text{ratio}\_G$$
$$B\_corrected\_i = B\_org\_i * \text{ratio}\_B$$
[Equation 3]

where (i) is used to indicate a particular pixel of pixels of an overlapped section (i.e., each pixel of the $n^{th}$ overlapped section has a different (i) value). R_corrected_i, G_corrected_i, and B_corrected_i denote corrected values for red, green, and blue components of a given pixel, respectively. R_org_i, G_org_i, and B_org_i denote original values of red, green, and blue components of the given pixel, respectively, i.e., uncorrected values of the red, green, and blue components of the given pixel.

The above-described operation of the image correction unit 224 is based on the assumption that that the image correction unit 224 corrects the color of the $n^{th}$ overlapped section but does not correct the color of the $(n+1)^{th}$ overlapped section. However, when the image correction unit 224 corrects the color of the $(n+1)^{th}$ overlapped section instead of correcting the color of the $n^{th}$ overlapped section, the image correction unit 224 may multiply a color value of each pixel of the $(n+1)^{th}$ overlapped section by a correction parameter calculated using Equation 2 and output the multiplied result as a corrected value for each pixel of the $(n+1)^{th}$ overlapped section.

As explained above, according to an exemplary embodiment, the image correction unit 224 can correct the color of an overlapped section by multiplying color values of all pixels of the overlapped section by a correction parameter. This will be described later in more detail with reference to FIG. 4. In this operation of the image correction unit 224, calculation load and time can increase as the number of pixels of the $n^{th}$ overlapped section (or the $(n+1)^{th}$ overlapped section) increases. To solve these problems, the image correction unit 224 can operate according to another exemplary embodiment. This exemplary embodiment will be described later with reference to FIG. 5 in comparison with an exemplary embodiment of FIG. 4.

After the image correction unit 224 corrects the color of the $n^{th}$ overlapped section (or the $(n+1)^{th}$ overlapped section), the image correction unit 224 generates a realignment signal. Then, the shift calculation unit 218 operates again in response to the realignment signal.

When a proper shift value is newly calculated by the shift calculation unit 218 in response to the realignment signal, the image aligning unit 220 moves at least one of the $n^{th}$ and $(n+1)^{th}$ captured images (or at least one of the $n^{th}$ and $(n+1)^{th}$ mapping images) by the newly calculated proper shift value.

Then, the comparison unit 226 calculates the difference between the current color similarity of the overlapped sections affected by the current movement and the previous color similarity of the overlapped sections affected by the previous movement, and then compares the difference with a critical value. Here, the current movement denotes the latest movement of the at least one of the $n^{th}$ and $(n+1)^{th}$ captured images (or at least one of the $n^{th}$ and $(n+1)^{th}$ mapping images) by the image aligning unit 220. Further, the critical value may be a preset reference value. In addition, the current color similarity and the previous color similarity of the overlapped sections are calculated by the shift calculation unit 218, and then the comparison unit 226 compares the difference between the current and previous similarities with the critical value.

Specifically, the comparison unit 226 calculates the difference between the current color similarity of the overlapped sections affected by the current movement and the previous color similarity of the overlapped sections affected by the previous movement. Then, the comparison unit 226 determines whether the difference is lager than a critical value.

If so, the comparison unit 226 signals the correction parameter calculation unit 222 to calculate a correction parameter in the same manner as described above, and if not, the comparison unit 226 signals the image aligning unit 220 to stitch the $n^{th}$ and $(n+1)^{th}$ mapping images so as to form a panoramic image. In exemplary embodiments, the term "stitch" is used when images are connected or combined to form a panoramic image.

Figures 3A, 3B:
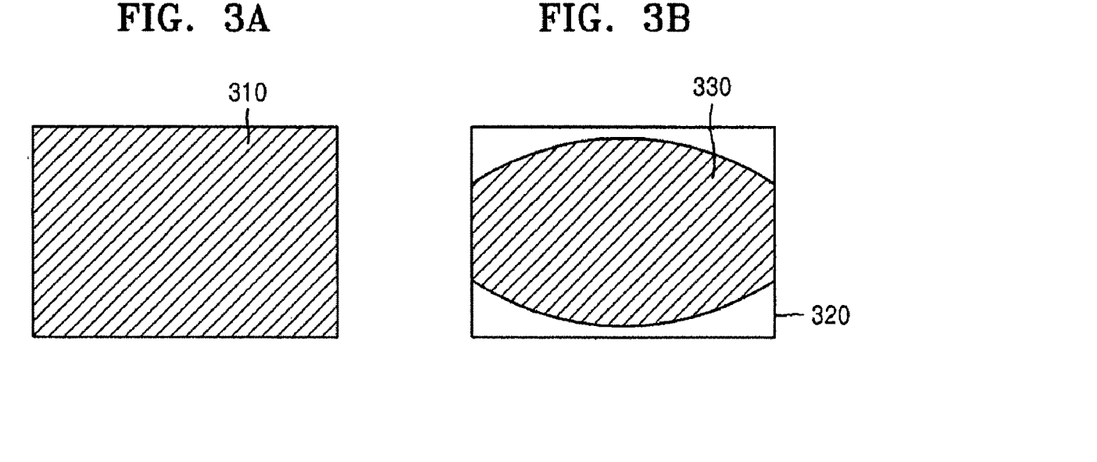
FIGS. 3A and 3B are diagrams illustrating an operation of a mapping unit of the image processing apparatus of FIG. 2, according to an exemplary embodiment.

FIGS. 3A and 3B are diagrams illustrating an operation of the mapping unit 216 of the image processing apparatus of FIG. 2, according to an exemplary embodiment.

The mapping unit 216 projects a captured image 310 onto a predetermined curved surface, e.g., a cylindrical surface or spherical surface, to form a mapping image 330. Here, the mapping unit 216 projects the captured image 310 in consideration of the focal length of the photographing device 100. Therefore, although the captured image 310 is rectangular, the mapping image 330 may have an elliptical shape with tapered ends.

Figure 4:
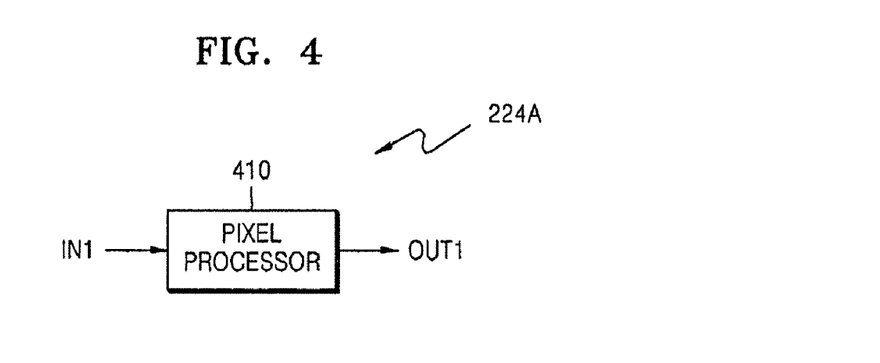
FIG. 4 is a block diagram illustrating an image adjusting unit of the image processing apparatus of FIG. 2, according to an exemplary embodiment.

FIG. 4 is a block diagram illustrating an image correction unit 224A which is a modified version of the image correction unit 224 of the image processing apparatus of FIG. 2 according to an exemplary embodiment. The image correction unit 224A can include a pixel processor 410.

The pixel processor 410 corrects the color of pixels of at least a portion of overlapped sections, i.e., the pixels of an $n^{th}$ overlapped section, using the correction parameter calculated by the correction parameter calculation unit 222.

Specifically, the pixel processor 410 multiplies the color value of each pixel of the $n^{th}$ overlapped section by the correction parameter so as to calculate a corrected color value for each pixel of the $n^{th}$ overlapped section. In this way, the pixel processor 410 corrects the color of the $n^{th}$ overlapped section and outputs the corrected $n^{th}$ overlapped section through an output terminal OUT1.

Figure 5:
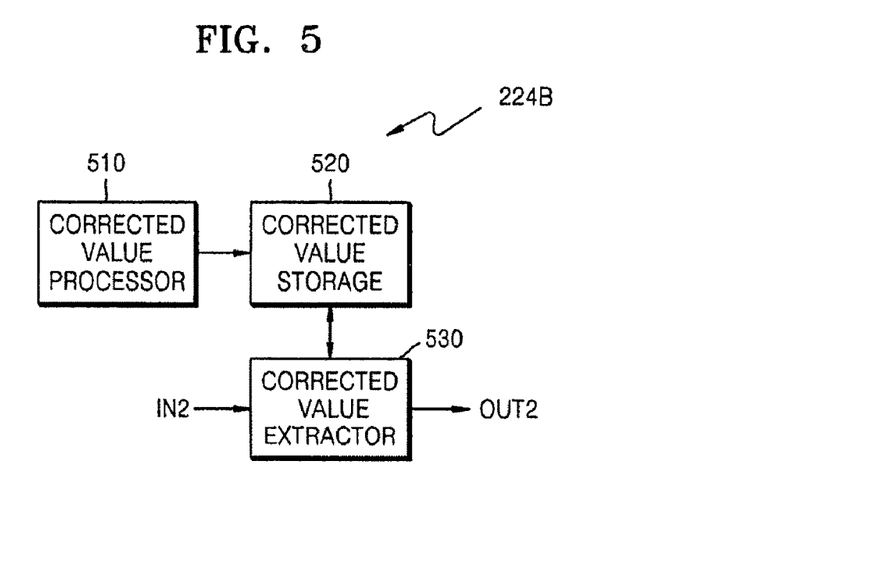
FIG. 5 is a block diagram illustrating the image adjusting unit of the image processing apparatus of FIG. 2, according to another exemplary embodiment.

FIG. 5 is a block diagram illustrating an image correction unit 224B which is a modified version of the image correction unit 224 of the image processing apparatus of FIG. 2 according to an exemplary embodiment. The image correction unit 224B can include a corrected value processor 510, a corrected value storage 520, and a corrected value extractor 530.

The correction value processor 510 calculates corrected values for all available color values using a correction parameter calculated by the correction parameter calculation unit 222. For example, the corrected value processor 510 multiplies all available color values by the correction parameter calculated from the correction parameter calculation unit 222 so as to calculate all available corrected values for the available color values. For example, the available color values may be 8-bit color values ranging from 0 to 255.

For example, the corrected value processor 510 calculates corrected values for all available values of a red component. The corrected value processor 510 calculates corrected values for all available values of a green component. The correction value processor 510 calculates corrected values for all available values of a blue component.

The corrected value storage 520 stores all available corrected values of the available color values using the available color values as addresses. That is, the corrected value storage 520 stores a lookup table (LUT) containing corrected values matched to available color values. For example, the corrected value storage 520 may include lookup tables for red, green, and blue components.

The corrected value extractor 530 extracts corrected values from the corrected value storage 520 for pixels of some portion of overlapped sections, i.e., the pixels of an $n^{th}$ overlapped section. Here, the corrected value extractor 530 receives information about the pixels of the $n^{th}$ overlapped section from the image aligning unit 220 through an input terminal IN2 and extracts the corrected values for the pixels using color values of the pixels as addresses for finding the corrected values from the corrected value storage 520. In this way, the corrected value extractor 530 corrects the color of the $n^{th}$ overlapped section and outputs the corrected $n^{th}$ overlapped section through an output terminal OUT2.

Operations of the image correction unit 224A of FIG. 4 and the image correction unit 224B will now be compared.

According to an exemplary embodiment of FIG. 4, the image correction unit 224A performs calculation for all pixels of an $n^{th}$ overlapped section to provide corrected values for color values of the pixels. Therefore, as the number of the pixels of the $n^{th}$ overlapped section increases, the calculation load and time of the image correction unit 224A increases.

On the other hand, according to an exemplary embodiment of FIG. 5, the image correction unit 224B provides corrected values for color values of the pixels of the $n^{th}$ overlapped section by extracting corrected values from the corrected value storage 520. Therefore, as the number of pixels of the $n^{th}$ overlapped section increases, the image correction unit 224B can provide corrected values for color values of the pixels of the $n^{th}$ overlapped section more rapidly than the image correction unit 224A. The calculation time difference may increase further more when the image correction unit 224A calculates the correction values by multiplication as described above. Furthermore, the calculation time difference is significant when the number of pixels of the $n^{th}$ overlapped section is larger than the number of available color values for a pixel, e.g., larger than 256. The reason for this is that the corrected value calculation unit 510 should perform calculations the same number of times as the number of available color values of a pixel to generate a lookup table and store the lookup table in the corrected value storage 520 so as to allow the corrected value extractor 530 to extract corrected values.

Figure 6:
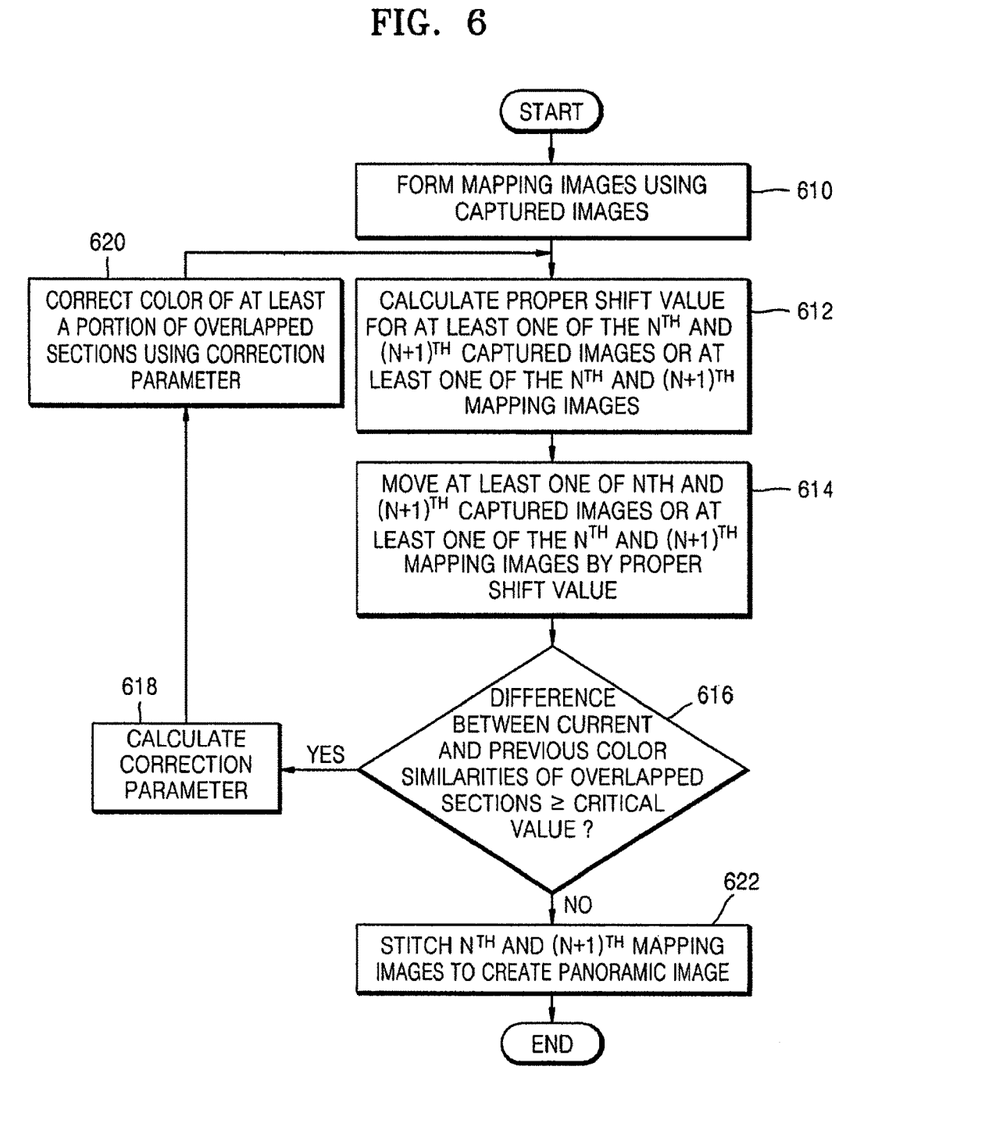
FIG. 6 is a flowchart for explaining an image processing method according to an exemplary embodiment.

FIG. 6 is a flowchart for explaining an image processing method according to an exemplary embodiment. The image processing method of the current exemplary embodiment includes operations 610 through 622 for producing a more realistic panoramic image by stitching images with overlapped sections of images being precisely aligned.

In operation 610, the mapping unit 216 projects $n^{th}$ and $(n+1)^{th}$ captured images onto a predetermined surface so as to form $n^{th}$ and $(n+1)^{th}$ mapping images.

In operation 612, the shift calculation unit 218 calculates a proper shift value for at least one of the $n^{th}$ and $(n+1)^{th}$ captured images or at least one of the $n^{th}$ and $(n+1)^{th}$ mapping images.

In operation 614, the image aligning unit 220 moves at least one of $n^{th}$ and $(n+1)^{th}$ captured images or at least one of the $n^{th}$ and $(n+1)^{th}$ mapping images by the proper shift value calculated in operation 612.

In operation 616, the comparison unit 226 compares a difference between color similarity between overlapped sections of the $n^{th}$ and $(n+1)^{th}$ captured images or the $n^{th}$ and $(n+1)^{th}$ mapping images which are currently moved in operation 614 and color similarity between the overlapped sections of the $n^{th}$ and $(n+1)^{th}$ captured images or the $n^{th}$ and $(n+1)^{th}$ mapping images which are previously moved in operation 614 is higher than a critical value.

If it is determined that the difference is higher than a critical value, the procedure goes to operation 618. In operation 618, the correction parameter calculation unit 222 calculates a correction parameter in consideration of the colors of the overlapped sections (specifically, $n^{th}$ and $(n+1)^{th}$ overlapped sections).

In operation 620, the image correction unit 224 corrects the color of at least a portion (hereinafter, referred to as an $n^{th}$ overlapped section according to the above-described assumption) of the $n^{th}$ and $(n+1)^{th}$ overlapped sections using the correction parameter calculated in operation 618, and proceeds to the operation 610.

If it is determined that the difference is lower than or equal to the critical value in operation 616, the procedure goes to operation 622. In operation 622, the image aligning unit 220 stitches the $n^{th}$ and $(n+1)^{th}$ mapping images. In detail, the image aligning unit 220 stitches the $n^{th}$ and $(n+1)^{th}$ mapping images by stitching the $n^{th}$ and $(n+1)^{th}$ overlapped sections.

Figure 7:
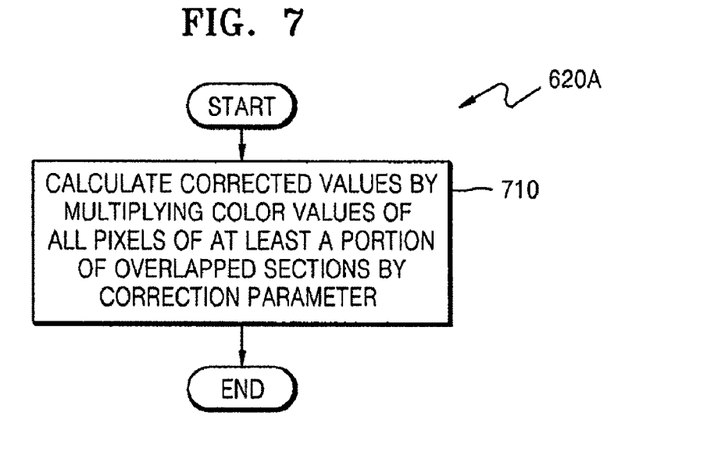
FIG. 7 is a flowchart for specifically explaining operation 620 of the image processing method of FIG. 6, according to an exemplary embodiment.

FIG. 7 is a flowchart for specifically explaining operation 620A which is a modified version of the operation 620 of the image processing method explained in FIG. 6 according to an exemplary embodiment. The operation 620A may include operation 710 for correcting the color of at least a portion of the overlapped sections of the $n^{th}$ and $(n+1)^{th}$ captured (or mapping) images using a correction parameter.

In operation 710, the image correction unit 224 calculates corrected values by multiplying color values of all pixels of the $n^{th}$ overlapped section by the correction parameter calculated in operation 618. In this way, the image correction unit 224 corrects the color of the $n^{th}$ overlapped section.

Figure 8:
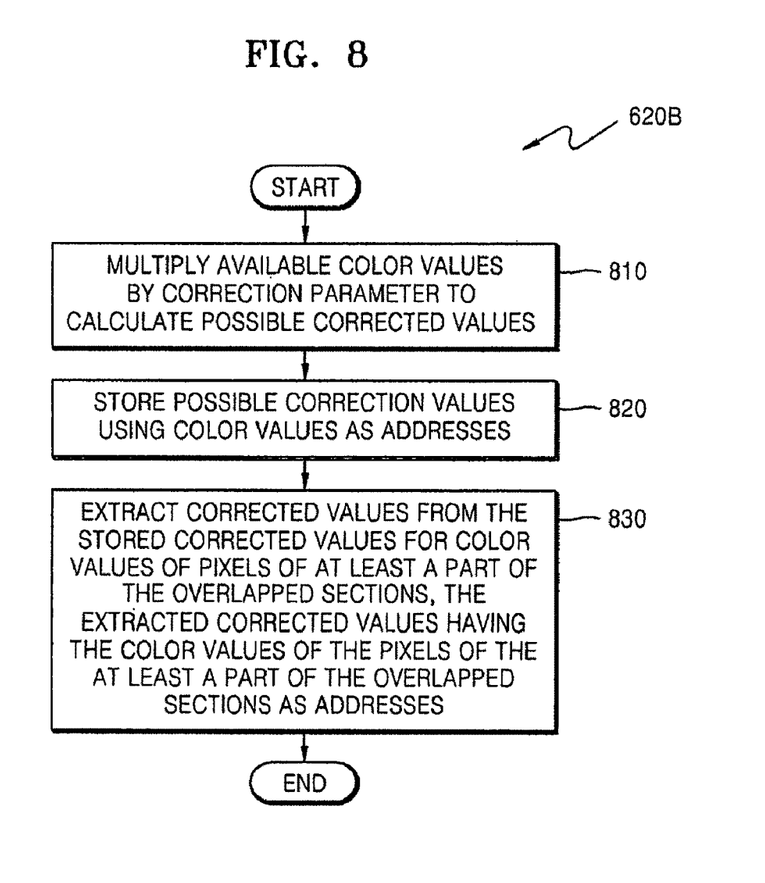
FIG. 8 is a flowchart for specifically explaining the operation 620 of the image processing method of FIG. 6, according to another exemplary embodiment.

FIG. 8 is a flowchart for specifically explaining operation 620B which is a modified version of the operation 620 of the image processing method explained in FIG. 6 according to an exemplary embodiment. Operation 620B may include operations 810, 820, and 830 for correcting the color of at least a portion of the overlapped sections of the $n^{th}$ and $(n+1)^{th}$ captured (or mapping) images using a correction parameter.

In operation 810, the image correction unit 224 multiplies each available color value (e.g., 0 to 255) of a pixel by the correction parameter calculated in operation 618 so as to calculate all possible corrected values for a color value.

In operation 820, the image correction unit 224 stores all the possible corrected values using the original color values as addresses of the corrected values.

In operation 830, the image correction unit 224 extracts a corrected value from the corrected values stored in operation 820 for the color value of each pixel of the $n^{th}$ overlapped section by using the color value of each pixel as an address of the corrected value. In this way, the image correction unit 224 corrects the color of the $n^{th}$ overlapped section.

As described above, the apparatus for and method of processing an image provides a more accurate panoramic image. At least one of images to be stitched is moved to maximize the color similarity between overlapped sections of the images, and the color of at least a portion of the overlapped sections of the image is corrected in consideration of the colors of the overlapped sections (for example, the color of one of the overlapped sections is corrected in consideration of the other of the overlapped sections). After that, at least one of the images is moved again so as to maximize the color similarity between the overlapped sections of the images once more. Then, the images are stitched together to create a panoramic image. Therefore, even when the overlapped sections of the images are not identical in color, the overlapped sections of the images can be precisely aligned when the images are stitched for forming the panoramic image, thereby making the panoramic image more accurate.

Furthermore, the color correction is performed in consideration of the colors of the overlapped sections of images to be stitched, and at least one of the images is shifted at least one time for maximizing the color similarity between the colors of the overlapped sections of the images. Therefore, the color similarity between the overlapped sections of the images, for example, the color similarity between pixels of the overlapped sections of the image, can be improved.

In addition, as the color correcting and image shifting operations are repeated much more, the overlapped sections of the images can be aligned very precisely for forming a panoramic image even when the initial colors of the overlapped sections of the images are not identical. After repeating the color correcting and image shifting operations, the images can be stitched together for creating a panoramic image.

Since it is generally required to generate a panoramic image within a limited time, the number of repetitions of the color correcting and image shifting operations can be controlled by presetting an upper limit. In this way, in exemplary embodiments, even when overlapped sections of images are not identical in color, the overlapped sections can be precisely aligned when the images are stitched, so that a more realistic panoramic image can be generated more rapidly.

As explained above, when the color correcting and image shifting operations are repeated, the color similarity between overlapped sections of images is calculated each time the image is shifted. Then, the color similarity of the overlapped sections of the images as a result of the current shifting operation is compared with the color similarity of the overlapped sections as a result of the previous shifting operation, and it is determined whether the difference between the current and previous color similarities is less than a predetermined critical value. If the difference is less than the critical value, the repetition of the color correcting and image shifting operations are terminated even when the number of repetition has not exceeded a preset upper limit. Thus, a panoramic image can be generated more rapidly.

Moreover, according to exemplary embodiments, corrected values for color values of pixels of overlapped sections of images can be obtained by multiplying the color values by a correction parameter or by extracting corrected values from a lookup table. In the latter method, corrected values for all available color values of a pixel are calculated by multiplying all available color values (e.g., 0 through 255) of a pixel by a correction parameter, and the corrected values are stored in a lookup table using the color values as addresses of the corrected values. Then, corrected values are extracted from the lookup table for color values of pixels of the overlapped sections. Therefore, image colors can be corrected more rapidly by obtaining corrected values using the former or latter methods depending on circumstances.

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include optical wires/lines, waveguides, and metallic wires/lines, etc. including a carrier wave transmitting signals specifying instructions, data structures, data files, etc. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

Although a few exemplary embodiments have been shown and described, it would be appreciated by those skilled in the art that changes may be made in these exemplary embodiments, the scope of which is defined in the claims and their equivalents.

What is claimed is:

1. An apparatus for processing an image, comprising:
   an image aligning unit to shift at least one image selected from images to be stitched for maximizing a color similarity between overlapped sections of the images and to operate again in response to a re-alignment signal;
   a comparison unit to compare a difference between a color similarity of the overlapped sections as a result of a current shifting of the at least one image and a color similarity of the overlapped sections as a result of a previous shifting of the at least one image with a critical value;
   a correction parameter calculation unit to calculate a correction parameter in consideration of the colors of the overlapped sections as a result of the shifting of the at least one image; and
   an image correction unit, implemented by at least one processing device, to generate the re-alignment signal after correcting a color of at least a part of the overlapped sections as a result of the shifting of the at least one image in consideration of colors of the overlapped sections using the calculated correction parameter, in response to a result of the comparison.

2. The apparatus of claim 1, wherein the image correction unit corrects color of each pixel of at least a part of the overlapped sections using the correction parameter.

3. The apparatus of claim 1, wherein the image correction unit comprises:
   a corrected value calculation unit to calculate corrected values using the correction parameter for all available color values;
   a corrected value storage to store the corrected values using the available color values as addresses of the corrected values; and
   a corrected value extractor to extract corrected values from the corrected value storage for color values of pixels of the at least a part of the overlapped sections, the extracted corrected values having the color values of the pixels of the at least a part of the overlapped sections as addresses.

4. The apparatus of claim 1, further comprising a display unit to display the processed image as a panoramic image.

5. A method for processing an image, comprising:
   (a) shifting at least one image selected from images to be stitched for maximizing a color similarity between overlapped sections of the images;
   (b) determining a difference between a color similarity of the overlapped sections as a result of a current shifting of the at least one image and a color similarity of the overlapped sections as a result of a previous shifting of the at least one image is larger than a critical value;
   (c) calculating a correction parameter in consideration of the colors of the overlapped sections as a result of the shifting the at least one image; and
   (d) correcting, performed by at least one processing device, a color of at least a part of the overlapped sections as a result of the shifting of the at least one image in consideration of colors of the overlapped sections, using the calculated correction parameter, in response to a result of the comparison and proceeding to (a).

6. The method of claim 5, wherein (d) corrects color of each pixel of the at least a part of the overlapped sections using the correction parameter.

7. The method of claim 5, wherein (d) comprises:
   calculating corrected values using the correction parameter for all available color values;
   storing the corrected values using the available color values as addresses of the corrected values; and
   extracting corrected values from the stored corrected values for color values of pixels of the at least a part of the overlapped sections, the extracted corrected values having the color values of the pixels of the at least a part of the overlapped sections as addresses.

8. The method of claim 5, further comprising displaying the processed image as a panoramic image.

9. A non-transitory computer-readable recording medium having a computer-readable program for executing a method for processing an image, the method comprising:
   shifting at least one image selected from images to be stitched for maximizing a color similarity between overlapped sections of the images;
   determining a difference between a color similarity of the overlapped sections as a result of a current shifting of the at least one image and a color similarity of the overlapped sections as a result of a previous shifting of the at least one image is larger than a critical value;
   calculating a correction parameter in consideration of the colors of the overlapped sections as a result of the shifting the at least one image; and
   correcting a color of at least a part of the overlapped sections as a result of the shifting of the at least one image in consideration of colors of the overlapped sections, using the calculated correction parameter, in response to a result of the comparison and proceeding to the shifting of the image.

* * * * *

UNITED STATES PATENT AND TRADEMARK OFFICE
CERTIFICATE OF CORRECTION

PATENT NO. : 8,000,561 B2
APPLICATION NO. : 11/902495
DATED : August 16, 2011
INVENTOR(S) : Hui Zhang et al.

Page 1 of 1

It is certified that error appears in the above-identified patent and that said Letters Patent is hereby corrected as shown below:

On the title page item (57), Column 2 (Abstract), Line 9, After "sections" insert -- . --.

Signed and Sealed this
Fourteenth Day of February, 2012

David J. Kappos
*Director of the United States Patent and Trademark Office*